United States Patent [19]

Davis

[11] 4,235,308
[45] Nov. 25, 1980

[54] LOCKING BRAKE FOR ARTICULATED VEHICLE

[75] Inventor: Charles J. Davis, Afton, Okla.
[73] Assignee: The General, Inc., Wichita, Kans.
[21] Appl. No.: 2,599
[22] Filed: Jan. 11, 1979
[51] Int. Cl.³ .................... B62D 53/00; B66F 9/06
[52] U.S. Cl. ............................ 187/9 R; 280/492; 414/636
[58] Field of Search ............ 280/400, 474, 492; 180/14 R, 233, 234, 237, 238; 414/636, 674, 699, 701; 182/9 R; 212/39 R, 39 MS, 39 A, 39 B; 303/100

[56] References Cited

U.S. PATENT DOCUMENTS

| | | | |
|---|---|---|---|
| 3,719,246 | 3/1973 | Bott | 303/100 X |
| 3,929,244 | 12/1975 | Ekstrom | 414/636 |
| 4,079,955 | 3/1978 | Thorpe | 280/492 X |
| 4,099,733 | 6/1978 | Ahonen | 280/400 X |
| 4,168,934 | 9/1979 | Downing et al. | 414/636 |

Primary Examiner—Stephen G. Kunin
Assistant Examiner—Terrance L. Siemens
Attorney, Agent, or Firm—Schmidt, Johnson, Hovey & Williams

[57] ABSTRACT

The front and rear sections of the vehicle are normally free to rock relative to one another about a fore-and-aft extending, horizontal axis to the extent necessary to compensate for lateral variations in ground contour between the front and rear of the vehicle. However, when a lift on the front of the vehicle is operated and it reaches a predetermined height, a fluid-pressure circuit is activated to frictionally engage a pair of brake parts on the two sections of the vehicle so as to hold the same against free rocking, thereby making the combined masses of the two sections available to counterbalance any tendency of the lifted load to tip the vehicle over sideways as the load is raised.

6 Claims, 4 Drawing Figures

U.S. Patent   Nov. 25, 1980   4,235,308
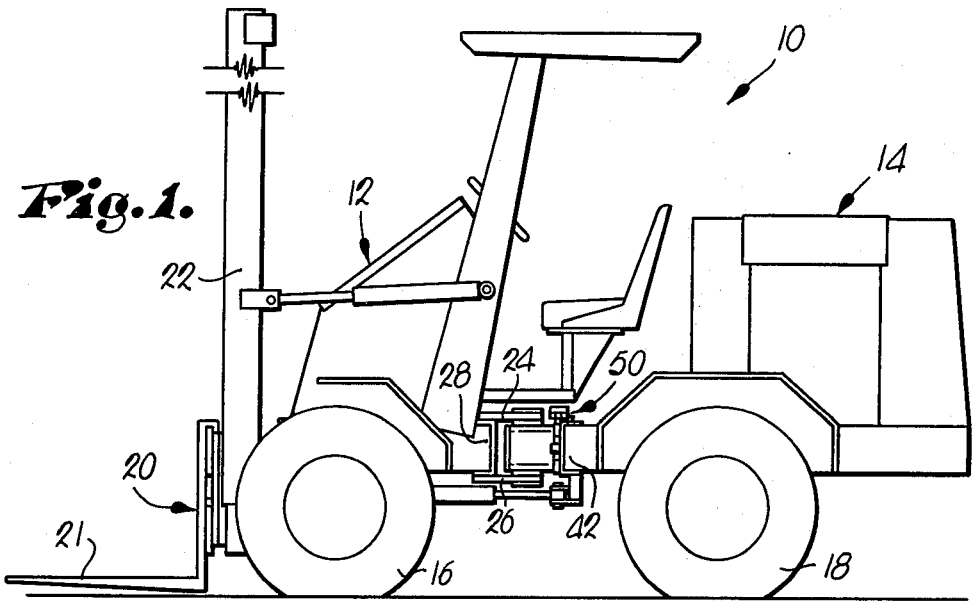
Fig.1.
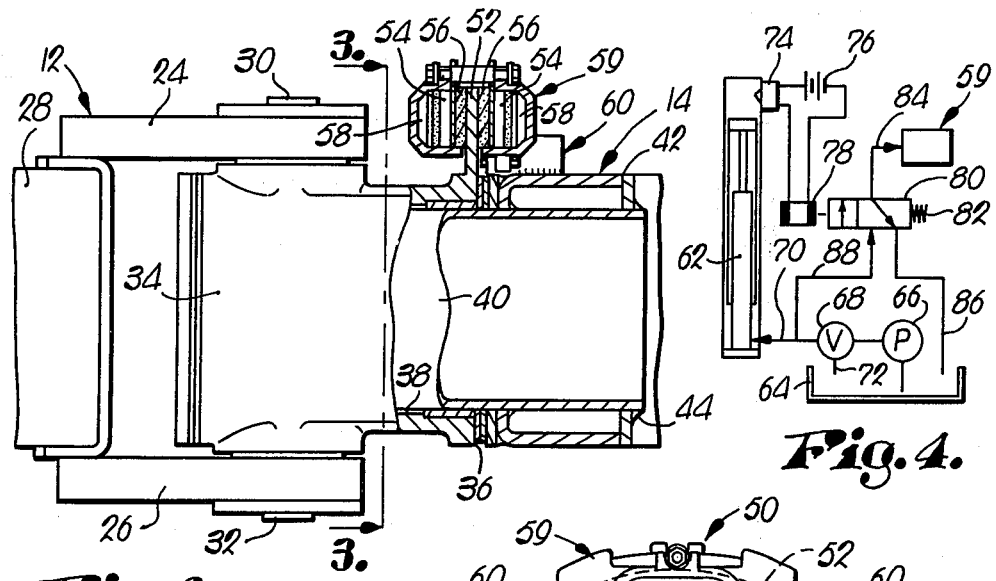
Fig.2.
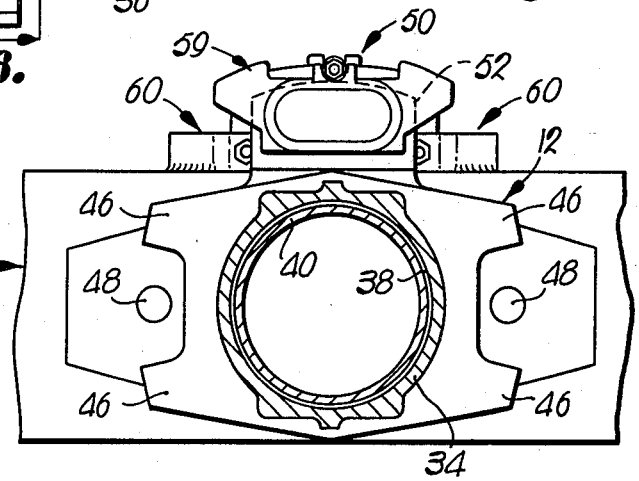
Fig.3.
Fig.4.

LOCKING BRAKE FOR ARTICULATED VEHICLE

TECHNICAL FIELD

This invention relates to the field of industrial material-handling vehicles of the articulated type having fore-and-aft extending pivots which permit front and rear sections thereof to rock relative to one another as lateral variations in terrain are encountered between the front and rear of such vehicles.

BACKGROUND ART

Vehicles are currently available which have free-pivoting front and rear sections so as to allow the two sections to rock laterally of one another about a fore-and-aft extending axis as may be required to maintain all four ground wheels engaged with the ground when uneven terrain is encountered. Typically, the free-rocking action is inhibited only by positive limit stops which function to positively preclude further relative rocking movement beyond a certain given amount of free travel.

While this feature is generally desirable, it may contribute to a less than desirable situation where one of the sections is provided with a lift capable of raising loads to relatively substantial heights above the ground. In such instance, if the front section to which the lift is attached is located on a lateral incline, then as the load is raised, the center of gravity of the combined load and front section becomes progressively more laterally disposed relative to the ground wheels of the section as the load is raised. Hence, the danger of tipover progressively increases as the load gets higher, and since the front section can rock freely relative to the rear section, the counterbalancing effect of the rear section cannot come into play until such time as the front section has started tipping and has reached the positive limit provided by the mechanical limit stop between the two sections. By then it may be too late to prevent a tipover considering the momentum of the load at the upper end of the elevated lift and the disposition of the center of gravity of the front section with its lifted load.

SUMMARY OF THE PRESENT INVENTION

Accordingly, an important object of the present invention is to provide a way of normally allowing free pivoting or free floating of the two sections as may be required by the vehicle during its movement over uneven terrain but to provide also for bringing the counterbalancing mast of the rear section of the vehicle into play at those times when the lift is raised to a certain predetermined height such that, under those circumstances, any load carried by the lift must overcome the combined masses of the front and rear sections in order to tip over the vehicle sideways.

In carrying out the above object, the present invention contemplates the use of an hydraulically operated brake having one or more friction pads on one of the rockable vehicle sections which can forcefully engage a cooperating part on the other section of the vehicle so as to effectively hold the two sections against relative rocking movement at those times when the lift is raised to and beyond a certain predetermined height. A limit switch on the mast of the lift energizes a solenoid when the lift reaches such predetermined height, the solenoid in turn opening a valve which allows hydraulic fluid under pressure to forcefully operate the frictionally interengaged parts of the brake.

BRIEF DESCRIPTION OF THE DRAWINGS

FIG. 1 is a side elevational view of an articulated vehicle having relatively rockable front and rear sections and incorporating a locking safety brake in accordance with the principles of the present invention;

FIG. 2 is an enlarged, fragmentary, elevational view of the central articulating and rocking structure of the vehicle as well as certain parts of the safety brake, certain portions of the illustrated construction being broken away and shown in cross section to reveal details;

FIG. 3 is a vertical cross-sectional view through the structure of FIG. 2 taken substantially along line 3—3 of FIG. 2; and FIG. 4 is a schematic diagram of the electrical and hydraulic circuitry involved in the present invention.

DETAILED DESCRIPTION

The vehicle 10 includes a front section 12 and a rear section 14 that are interconnected for relative rocking movement about a fore-and-aft axis with respect to the normal path of travel of the vehicle 10. The front section 12 has a pair of ground wheels 16 (only one of such wheels being shown), while the rear section 14 is likewise provided with a pair of ground wheels 18 (only one of such wheels being shown). A lift 20 carried by the front section 12 rocks with the latter as lateral changes in the terrain relative to that encountered by the rear section 14 are traversed, and an upright, vertically telescoping mast 22 of the lift 20 (the construction of which is well understood by those skilled in the art) adapts the lifting fork 21 of lift 20 for vertical reciprocating movement such that the lift 20 can be used to raise loads substantial distances above the ground (for example, on the order of twenty feet or more) as may be required when the vehicle 10 is in use at a job site.

The vehicle 10 is of the horizontal articulating type in addition to its lateral "free floating" capabilities, and to this end as illustrated perhaps most clearly in FIG. 2, the front section 12 is provided with upper and lower, vertically spaced apart, fore-and-aft extending bars 24 and 26 respectively that are rigid to the frame 28 of section 12 adjacent their front ends and are provided with a pair of vertically disposed and coaxially aligned, upper and lower trunnions 30 and 32 respectively adjacent their rear ends. The trunnions 30 and 32 in turn journal a tubular housing 34 disposed between the bars 24,26 and projecting rearwardly beyond the same to terminate in a rearwardly facing open end 36.

The housing 34 is of transversely circular cross section, having an internal bore 38 that coaxially and rotatably receives a tubular shank 40 projecting forwardly from the rear section 14 and rigidly affixed to the frame 42 of the latter such as by welds 44 at the rearmost end of the shank 40. The shank 40 is retained within the housing 34 against longitudinal shifting relative thereto by means not shown and, thus, the construction is such that the sections 12 and 14 can articulate relative to one another about a vertical axis defined by the trunnions 30,32 and can rock laterally relative to one another about the common, fore-and-aft axis of the housing 34 and the shank 40 as the latter rotates within the bore 38. Laterally projecting limit ears 46 adjacent the rear end 36 of housing 34 are disposed to positively engage fore-and-aft extending shoulders 48 adjacent the forward end of the frame 42 of rear section 14 for the purpose of defining the opposite extreme limits of such relative rocking movement of the sections 12 and 14.

In accordance with the principles of the present invention, the vehicle 10 is provided with a safety brake broadly denoted by the numeral 50, the actuation of which causes the two sections 12 and 14 to be temporarily held against relative rocking movement. The brake 50 includes frictionally interengageable parts on the two sections 12 and 14 which may be brought into and out of forceful interengagement with one another so as to apply and release the desired braking action, such parts including an upstanding lug 52 integral with the housing 34, and a pair of clamping pistons 54 on opposite sides of the lug 52 and provided with friction pads 56 engageable with such opposite sides of the lug 52. The pistons 54 are disposed within respective chambers 58 for slight movement toward and away from the lug 52 so as to apply and release braking pressure.

The particular nature of the means for applying holding pressure against the lug 52 is somewhat open to choice. As a matter of convenience, it may take the form of a caliper assembly 59 of the type available from Hurst Performance, Inc. of Warminster, Pennsylvania. Accordingly, further details of such assembly will not be set forth herein. Suffice it to point out, however, that the chambers 58 communicate with a source of hydraulic fluid pressure (discussed below) so as to cause the pistons 54 to clamp the lug 52 therebetween when fluid pressure is applied behind the pistons 54. On the other hand, suitable return spring means (not shown) release the pressure of pistons 54 against the lug 52 when hydraulic pressure within the chambers 58 is likewise sufficiently dropped. Mounting structure broadly denoted by the numeral 60 rigidly secures the assembly 59 to the frame 42 of rear section 14.

FIG. 4 represents further details on a schematic basis of the various hydraulic and electrical circuitry involved in connection with the present invention and sets forth further components of the brake 50. As illustrated, part of the lift 20 includes a vertically disposed hydraulic cylinder 62 that provides power for telescoping the mast 22 such as to raise and lower the lifting fork 21. The hydraulic cylinder 62 is supplied hydraulic fluid from a reservoir 64 by a pump 66 at those times determined by the position of a valve 68 that is normally disposed in a position to preclude the pressurized flow of fluid into cylinder 62 through line 70 and instead to simply return such fluid to the reservoir 64 via return line 72. The cylinder 62 is single acting so as to be extended by the application of high-pressure fluid through the line 70 and retracted simply by gravity when the line 70 is closed by the valve 68.

The components thus far described in FIG. 4 comprise not only means for actuating the lift 20, but also comprise a portion of the brake 50, i.e., a portion of the means for actuating the brake assembly 59. Further components of the brake 50, and particularly further components of the means for operating or actuating the brake assembly 59, include a sensor in the nature of an electrical microswitch 74 associated with the lift 20 in a position to be closed by the latter when the lifting fork 21 reached a certain predetermined height. The switch 74 comprises a portion of an electrical circuit that additionally includes a source of electrical power illustrated, for example, by the battery 76 in the illustrated embodiment, and a solenoid 78 capable of operating an hydraulic valve 80 between a pair of alternate positions thereof. When the switch 74 is open as illustrated in FIG. 4, a spring 82 yieldably maintains the valve 80 in the illustrated position such that the chambers 58 of the brake assembly 59 are communicated with the reservoir 64 via lines 84 and 86. On the other hand, when the cylinder 62 is extended so as to raise the lifting fork 21 to the predetermined height that causes closure of the switch 74, the solenoid 78 shifts the valve 80 rightwardly from the position in FIG. 4 so as to close the return line 86 and instead communicate the chambers 58 of brake assembly 59 with the high pressure line 70 via line 84 and a line 88.

OPERATION

Operation of the brake 50 should be apparent from the foregoing description. However, briefly, such operation may be described as follows.

Under normal conditions, the brake assembly 59 remains unactuated without substantial clamping pressure of the pads 56 against the lug 52. Accordingly, the front and rear sections 12 and 14 respectively of the vehicle 10 are free to rock relative to one another about the common axis of the housing 34 and the shank 40 to the extent necessary to maintain all four of the ground wheels 16,18 on the ground. This, of course, assumes that the lift 20 is in a lowered condition as illustrated in FIG. 1.

On the other hand, when the lifting fork 21 is raised by the mast 22 and cylinder 62 to a certain predetermined height sufficient to actuate the microswitch 74, the hydraulic pressure used in extending the cylinder 62 is likewise routed to the chambers 58 of the brake assembly 59 because the solenoid 78 will have shifted the valve 80 rightwardly from its FIG. 4 position to place the lines 84 and 88 into communication with one another. Consequently, the pads 56 associated with pistons 54 apply a frictional clamping force against opposite sides of the lug 52 to thereby effectively hold the shank 40 against rotation within the housing 34, this in turn precluding relative lateral rocking of the vehicle sections 12 and 14.

When the lifting fork 21 is thereafter lowered below the height causing closure of the microswitch 74, the latter opens the electrical circuit associated therewith to in turn deactivate the solenoid 78 so that the return spring 82 can shift the valve 80 back to the FIG. 4 position in which the line 84 from chambers 58 is registered with the drain line 86, thereby bleeding the chambers 58 of oil and allowing the internal return spring (not shown) of the assembly 59 to back off the pistons 54 so as to release the braking pressure applied against the lug 52. This reinstates the free float rockability of the sections 12 and 14 with respect to each other.

As discussed in the opening passages of this specification, the ability to lock up the sections 12 and 14 when the lifting fork 21 reaches a certain height is extremely important from the standpoint of operator safety. As the fork 21 is raised, any load thereon inherently and progressively increases its negative effect on the stability of the vehicle 10. If the front section 12 is on a lateral incline, or is exposed to such an incline while the vehicle is moving and the load is raised, the load can exert a substantial moment about the fore-and-aft axis of the housing 34 and shank 40 tending to rotate the section 12. Without the brake 50 of the present invention, such moment exerted by the raised load is resisted only by the mass of the front section 12 until the sections 12 and 14 have rocked relatively sufficiently far to engage the limit ears 46 with the shoulders 48. At that point the mass of the rear section 14 also comes into play, but that may be too late to overcome the combined force of the moment exerted by the raised load and its momentum so that the vehicle 10 cannot be kept from tipping over sideways.

On the other hand, with the brake 50 of the present invention, the mass of the rear section 14 immediately comes into play when the fork 21 is raised to a certain predetermined height. From that point on, the mass of the total vehicle 10, including both sections 12 and 14, must be overcome by the raised load in order to tip over the vehicle 10, thereby resulting in substantially greater stability and operating safety.

I claim:

1. In combination with a vehicle having a pair of sections interconnected for relative rocking movement about a longitudinal generally horizontal axis with respect to the normal path of travel, a safety brake means comprising:
   a brake for holding said sections against said rocking movement; and
   automatic means for temporarily actuating said brake in response to the existence of a certain predetermined condition involving said vehicle.

2. The combination as claimed in claim 1, wherein said brake comprises a pair of frictionally interengageable parts on opposite ones of said sections.

3. The combination as claimed in claim 2, wherein at least one of said frictionally interengageable parts is fluid pressure-operated.

4. In combination with a vehicle having a pair of sections interconnected for relative rocking movement about a generally horizontal axis, a safety brake comprising:
   means for holding said sections against said rocking movement; and means for temporarily actuating said holding means,
   one of said sections being provided with a vertically operable lift for raising a load above the ground, said actuating means operating said holding means in response to said lift reaching a predetermined height.

5. The combination as claimed in claim 4, wherein said holding means includes a pair of frictionally interengageable parts on said sections respectively, said actuating means including a sensor operable by said lift when the latter reaches said predetermined height and further including means coupled with said sensor for forcefully effecting said interengagement of said parts upon said operation of the sensor.

6. The combination as claimed in claim 5, wherein at least one of said parts is fluid pressure-operated in effecting said forceful interengagement of the parts, said sensor comprising a component of an electrical circuit operable to control said fluid pressure-operation of said one part.

* * * * *